United States Patent [19]

Bergström et al.

[11] Patent Number: 4,747,582
[45] Date of Patent: May 31, 1988

[54] MANIPULATOR AT FURNACES

[76] Inventors: Sven E. Bergström, Svartnäsgatan 17, 781 52 Borlänge; Peter Gossas, Skillingsgatan 5, 781 62 Borlänge, both of Sweden

[21] Appl. No.: 876,894

[22] PCT Filed: Oct. 2, 1985

[86] PCT No.: PCT/SE85/00380
§ 371 Date: Jun. 18, 1986
§ 102(e) Date: Jun. 18, 1986

[87] PCT Pub. No.: WO86/02437
PCT Pub. Date: Apr. 24, 1986

[30] Foreign Application Priority Data

Oct. 10, 1984 [SE] Sweden ............................ 8405060

[51] Int. Cl.[4] .......................................... C21C 5/46
[52] U.S. Cl. ..................................... 266/226; 266/87; 266/271; 373/85
[58] Field of Search ................ 266/87, 225, 226, 265, 266/271, 272, 287; 373/85, 86, 87

[56] References Cited

U.S. PATENT DOCUMENTS

| 3,439,912 | 4/1969 | Berger | 266/226 |
| 3,549,139 | 12/1970 | Marxen | 266/226 |
| 4,122,296 | 10/1978 | Hümmler et al. | 266/233 |
| 4,431,171 | 2/1984 | Foster | 266/287 |

Primary Examiner—L. Dewayne Rutledge
Assistant Examiner—Robert L. McDowell
Attorney, Agent, or Firm—Watson, Cole, Grindle & Watson

[57] ABSTRACT

Manipulator for guiding of devices for treatment of heats in furnaces, ladles and the like, e.g. lances for injection of oxygen through a door (3) of an electromelting furnace, consisting of a feed table (19), on which one or several devices (24,29) are arranged displaceable mechanically guided in its length direction by means of one or several feed devices, at which the feed table (19) is movable mechanically guided between an advanced position at a work point (14), where the feed table (19) is immediately in front of the furnace door (3) or the like, at which the devices (24,29) can be inserted into the furnace (2) and possibly lowered down into the heat, and a retracted position, where the feed table (19) is removed from the furnace door (3).

9 Claims, 2 Drawing Sheets

MANIPULATOR AT FURNACES

BACKGROUND OF THE INVENTION

The present invention relates to a manipulator for guiding devices used for treating heats in furnaces, ladles and the like, e.g., lances for injecting oxygen through a door of an electro-melting furnace. More generally, the invention relates to manipulators for remotely controlling devices to be inserted into vessels of any kind, especially vessels contained in environments, where the working conditions are hazardous.

In metallurgical processes where a metal heat is treated by injection of a gas such as oxygen, a mixture of a gas and a solid material in powder form such as pulverized coal, a liquid, a liquid suspension, or a mixture of a gas and a liquid, such injection is in many cases carried out by using a tubular lance which is inserted into the melt, the gas and/or liquid substance(s) being blown therethrough and into the melt. As for electorsteel furnaces for melting of steel scrap, the scrap is melted in a furnace vessel provided with a cover through which electrodes are lowered down towards the scrap material and the heat. Oxygen is added through one or several lances which are inserted through an opening in the wall of the vessel, e.g., an opening for removal of slag from the heat, and down into the melt. The lance is thereby arranged on a manually drawn car on an adjacent platform, by which its position in the heat also can be roughly adjusted. The disadvantage of this car is that the operating personnel must be positioned close to the furnace, which exposes them to a risk of injuries e.g., due to splashing from the furnace.

The lance can also be arranged on a stand fixed to the furnace platform, whereby the lance is displaceable in its length direction inwardly or outwardly of the furnace through a small door in the furnace wall. The disadvantage of this arrangement is that the lance cannot be lowered down at different angles towards the melt in the furnace.

With the aim of improving the guiding of the lance, a car provided with a feed table for one or several lances has been developed. The feed table can be raised and lowered and can be inclined forward and backwards. The lance can also be fed forward and backwards in its length direction. The disadvantage of this car is the same as for the one described above: the risk of injury to the personnel operating the car.

As regards metallurgical melting furnaces, it also occurs that slag floating on top of the metal heat is removed from the surface of the heat by tilting the furnace so that the slag flows through a door in the furnace wall. During this procedure slag can become frozen in the sides of the door and must be removed with a special device. Such a device can be arranged on a mechanically operated car on the furnace platform in front of the deslagging door. The device is consists of a bar that is provided with a scraper which is inserted into the door and enables the frozen slag to be removed. The disadvantage of known devices is a they are expensive to manufacture and that rather great precision is required during their handling to obtain the desired result. Anothor disadvantage is that remote control of them is difficult to realize.

SUMMARY OF THE INVENTION

The aim of the present invention is to produce a device for, e.g., guiding of lances at a melting furnace, which does not have the disadvantages of known devices. The aim has been attained by means of a manipulator consisting of a feed table on which one or several devices are arranged to be displaceable in their length direction and mechanically guided by means of one or several feed devices. The invention is characterized in that the feed table is mechanically movable and guided between an advanced position at a work point where the feed table is immediately in front of, a door of e.g., an electro-melting furnace or the like, at which the devices can be inserted into the furnace and possibly lowered down into the heat and a retracted position, where the feed table is removed from the furnace door. By this the manipulator can be remote-controlled to exact positions on the whole in relation to the furnace in a considerably easier way in comparison with known wheeled devices, which are feely movable on the furnace level in front of the furnace or the like.

The work point is preferably vertically adjustable and laterally displaceable in relation to the furnace door. The feed table is also horizontally and vertically rotatable around the work point and displaceable in its length direction in relation to the work point. The work point can also be set in a fixed position in relation to the furnace door in case the furnace must be tilted. This is possible, as the devices supporting the feed table are connected with the furnace. By this the devices of the manipulator can be differently tilted in relation to the furnace and the heat in it as well as in different positions in relation to e.g. the furnace door.

Of the devices of the manipulator at least one is a tubular lance for injection of a gas (e.g., oxygen), a mixture of a gas or a solid powdered material e.g., of coal or iron oxide), a liquid, a liquid suspension, or a mixture of a gas and a liquid when the manipulator is used at an electro-steel furnace for melting of scrap. At this occasion the feed device is equipped with a lance holder to which gas or gas and powder is delivered via a feed pipe. The lance holder is preferably displaceable along a guide running along the feed table and is connected with a drive arranged on the feed table. The drive can be an endless chain, wire or the like, running over guide wheels at the ends and possible support wheels of the food table along its length, at which at least one of the wheels is connected with a drive motor. By this gas or gas and powder can be injected into, e.g., a furnace completely through remote control implying that the personnel at the furnace don't have to stay near it and be exposed to risks of injuries, e.g., from liquid metal or slag splashing from the furnace.

At least one of the devices of the manipulator can very well be a working device by means of which pressure and tractive forces or blows can be directed towards slag or the like which has frozen fast in the furnace door or the like. The working device can thereby consist of a scraper, which can be given a forward or return motion by which, e.g., the slag can be removed from the furnace door.

Another device on the manipulator can consist of a temperature sensor, which like the lances, when required, can be inserted into the furnace for temperature measurement during a melting process. The temperature sensor can be inserted into the furnace by means of the same kind of drive as for the lances.

The remote control of the manipulator can very well be supervised by means of a TV-camera, which can be arranged on or near the feed table and which can be connected to a viewing screen situated near the remote-control devices which can be located in a screened cabin at a rather long distance from the furnace. The transfer of control impulses to the manipulator can be carried out either via electric cables or via a radio. The control devices can also be arranged on a portable panel from which control impulses are transferred to the manipulator via a radio.

During a work cycle, e.g., when steel scrap is melted in an electro-melting furnace, the furnace is first filled with scrap, after which electrodes are lowered down towards the scrap and electric power is switched on. The feed table is then in retracted position, where it is provided with new lances for injection of oxygen. As soon as the melting is started the feed table is moved to its advanced position, where it is set in desired inclination towards the furnace door. The feed table is then brought forward in its length direction, until its front edge is quite close to the furnace door, whereupon one or several lances are introduced into the furnace and possibly down into the heat, which is successively formed and so oxygen is injected into the heat. A temperature sensor is now and then introduced into the furnace in the same way as the lances. The lances are successively burnt up and are fed forward, until the lance holder is at the front edge of the feed table nearest to the furnace door. When this position has been reached the oxygen gas flow is cut off, after which the feed table is taken back as well as the lance holders. Remaining lance parts are now removed and new lances installed. In the meantime the furnace can be tilted to allow the slag to flow out of the furnace door. The feed table is again brought up to the work point, where the slag is removed before the lances are again inserted into the furnace and the injection of oxygen is continued. Slag, which has frozen fast in the furnace door, can possibly also be burnt off by means of oxygen. The invention will be better understood by reference to the attached drawings, taken in conjunction with the following discussion.

DESCRIPTION OF FIGURES

FIG. 3 shows a detail of the feed table of the manipulator as well as the furnace door in cross-section.

FIG. 4 shows an alternative design of the slag scraper as shown in FIGS. 1 and 3.

DETAILED DESCRIPTION OF THE PREFERRED EMBODIMENTS

The manipulator according to a first preferred embodiment of the invention is stationary arranged an a tiltable frame structure 1 of an electro-steel furnace 2 (fragmentarily shown in the figures) which is equipped with a door 3 for removal of slag from the furnace 2 when it is tilted towards a furnace platform, which is stationary in relation to the surrounding building (not shown).

Figure 1:
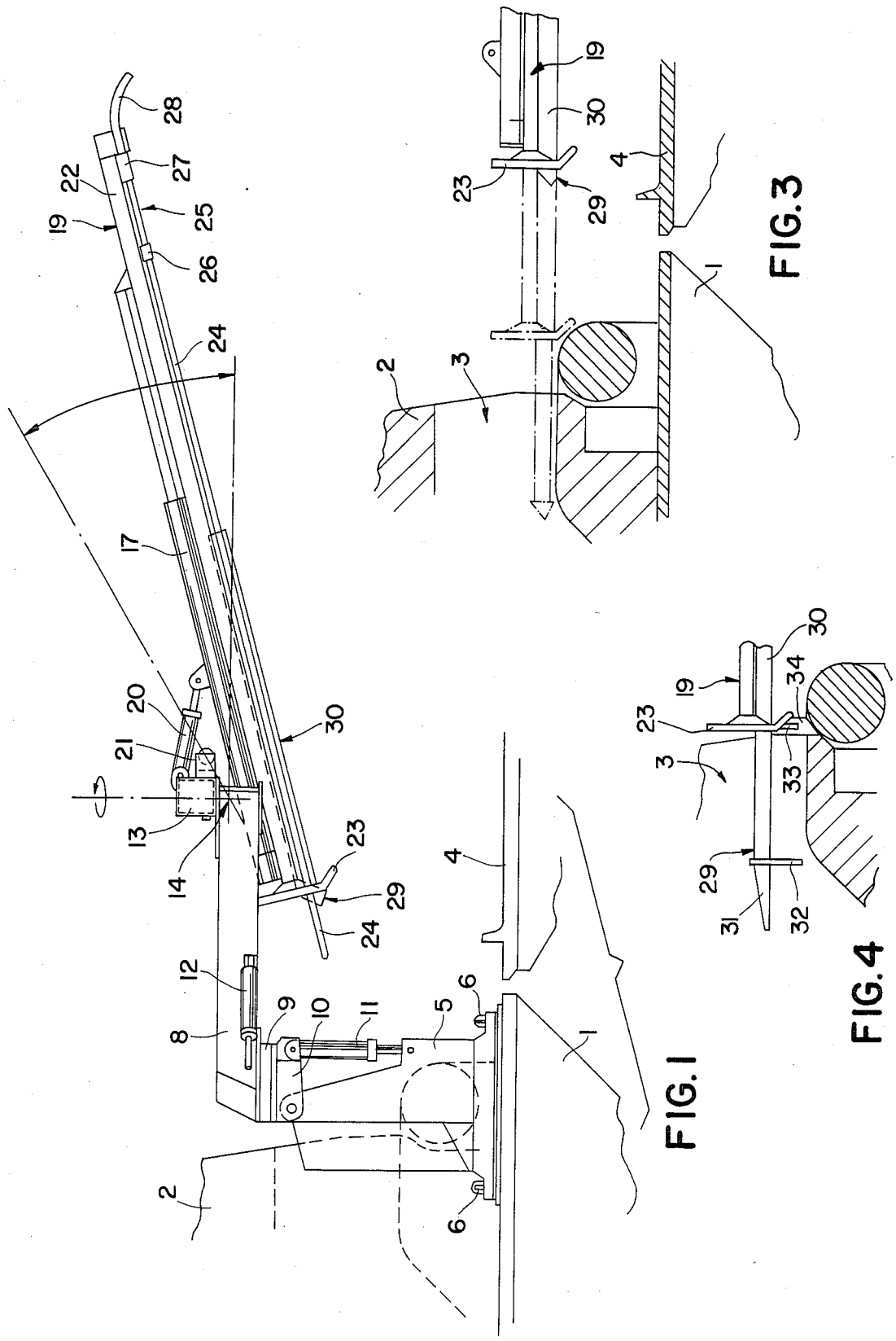
FIG. 1 shows a manipulator near a door of an electro-steel furnace seen in a vertical plane.
Figure 2:
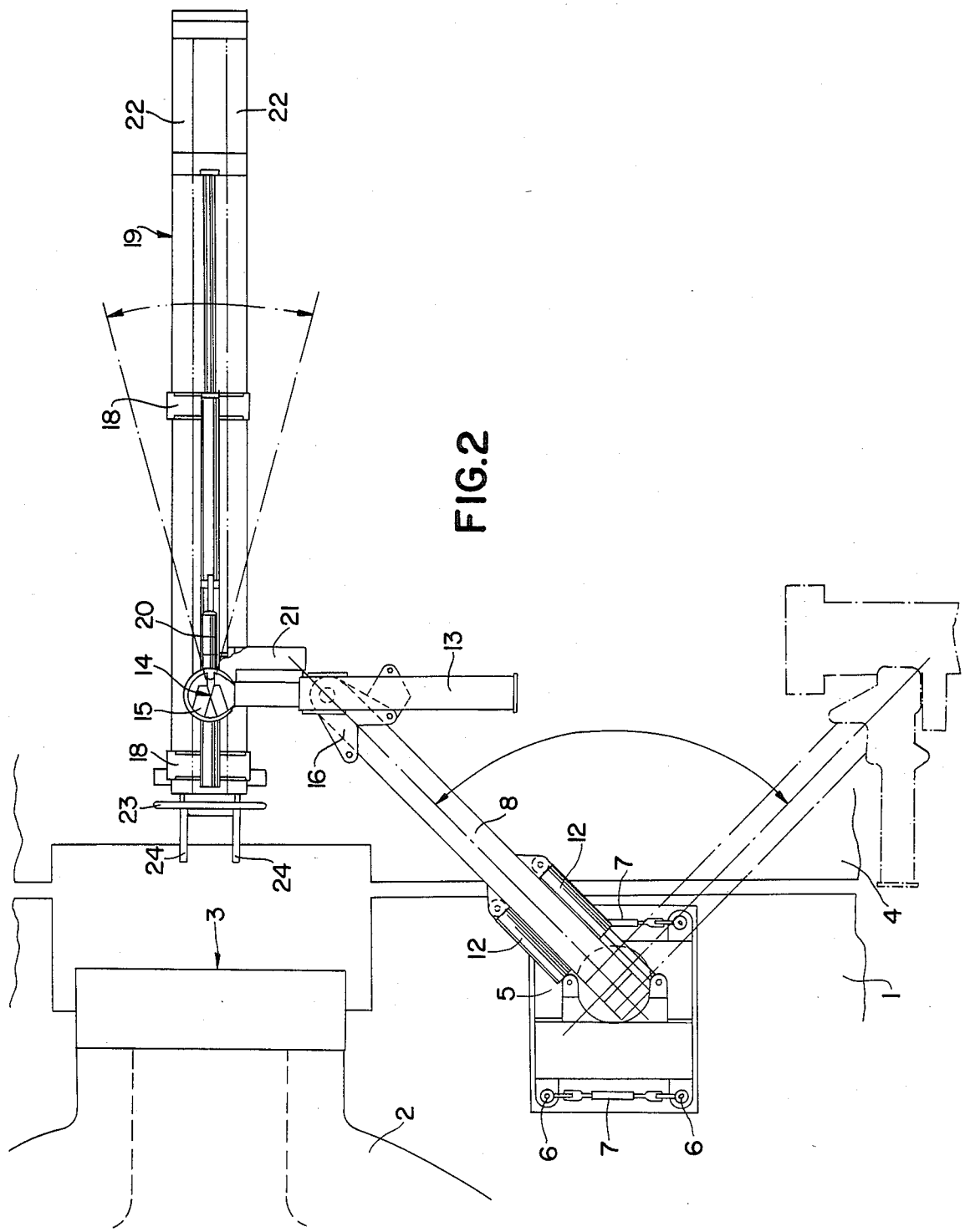
FIG. 2 shows a manipulator according to FIG. 1 seen in a horizontal plane.

The manipulator consists of a stand 5, which is stationarily arranged on the structure 1 by means of four cotter bolts, the cotters of which are kept drawn-in in pairs by means of rigging screws 7 extending between every pair of bolts 6 and connected to the respective cotters thereof. A swinging bracket 8 is installed in a swing head 9 at the upper end of the stand, the pivot axle of which can be differently tilted towards the upper part of the stand 5 by means of a rocker arm 10 on which the swing head 9 is mounted, one end of the rocker arm being pivoted at the upper end of the stand 5 and the other end being connected with the lower part of the stand 5. The swinging bracket 8 swivels in the swing head 9 by means of two hydraulic swing cylinders 12, which are arranged in a plane at right angles to the pivot axle on each side of the swinging bracket 8. The respective swing cylinders 12 are connected with the swinging bracket 8 as well as with the stand 5. The swinging bracket 8 swivels between an advanced position, i.e., near the furnace door 3 and a retracted position as shown in dotted lines in FIG. 2.

The free end of the swinging bracket 8 supports a hydraulic cylinder 13 by means of which a suspension point 14, i.e., the work point of the manipulator, can be displaced mainly along a straight line laterally when the manipulator is in advanced position in front of the furnace door 3. The work point 14 is in the fixed pivot of a rotating head 15, which is supported by the piston-rod of the cylinder 13. In such case, where the stand 5 is situated on the other side of the furnace door 3 according to FIG. 2, the cylinder 13 is turned in relation to the swinging bracket 8 in a two-way holder 16 and is fixed in the alternative position.

The rotating head 15 supports a hydraulic cylinder 17 on which two brackets 18 are mounted, which in turn carry a feed table 19 that is displaceable in the length direction of the cylinder 17 by means of guides arranged on the respective brackets 18, i.e., so as towards move to the furnace door 3. The cylinder 17 and by that the feed table 19 can be turned in two planes being at right angles to each other through the turning point 14, partly by means of a hydraulic cylinder 20, by means of which the table 19 can be differently tilted towards the furnace door 3, and partly a hydraulic cylinder 21, by means of which the table 19 can be set laterally in relation to the furnace door 3. The cylinder 20 for inclination as well as the cylinder 21 for side setting are connected with the cylinder 17 for forward movement and with that part of the rotating head 15 which is fixed with the piston-rod of the cylinder for lateral movement 13.

The feed table 19 consists of two parallel U-beams 22 that extend in the direction of forward movement. The front end of the feed table 19 is equipped with a water-cooled shield 23, which mainly extends in right angle to the feed direction and protrudes on the underside of the U-beams 22. The feed table carries two tubular lances 24 the front part of each being led through an opening in the shield 23 and the rear end of each being connected to a lance holder 25 that partly consists of a jointing sleeve 26 and partly a travelling car 27 which can travel along the underside of the associated U-beam 22. Oxygen is fed to the respective lance 24 via the lance holder 25 from a feed pipe 28. The lance holder concerned 25 is through the travelling car concerned 27 connected with a drive of known kind, which cannot be seen in the figures. The drive consists of an endless drive chain, wire or the like running over guided wheels at the ends and support wheels of the table 19 along its length, at which one of the wheels are connected with a drive motor.

The feed table 19 is also provided with a working device 29 in the form of a scraper, which can be given a movement forward or backwards in the feed direction and by means of which slag can be scraped away from the furnace door 3. The scraper 29 is activated by a hydraulic cylinder 30 arranged on the underside of the feed table 19. The scraper 29 is shown with dotted lines inserted into the furnace door 3 in FIG. 3, at which the feed table 19 is in advanced position with the shield 23 leaning against the front of the furnace 2. An alternative design of the scraper 29 is shown in FIG. 4, where it has been provided with a marked piercer 31 projecting out in the feed direction and a scraper plate 32 placed at right angle to it and protruding down from the piercer. To relieve the feed table 19 from forces arising when the scraper 29 is in operation the table can be fixed in relation to the furnace door 3 by means of a holder-on 33 arranged on the feed table 19 mounted in a corresponding bracket 34 on the furnace 2.

We claim:

1. A manipulator apparatus for supporting and moving at least one elongated treatment device toward and away from an opening in a furnace and for moving each elongated treatment device into and out of the furnace through the opening therein, said manipulator device comprising
    a support stand which is attachable to the furnace so as to be positioned laterally of the opening in the furnace,
    a swinging bracket which is attached to said support stand so as to be horizontally and vertically rotatable with respect thereto, said swinging bracket having a free end which is remote from said support stand,
    a first hydraulic cylinder attached to the free end of said support stand and including a movable piston having a free end which mounts a rotatable support head, and
    an elongated feed table attached to said rotatable support head so as to be horizontally and vertically movable with respect thereto and also displaceable in its longitudinal direction, said elongated feed table being capable of supporting at least one elongated treatment device,
    said swinging bracket and said first hydraulic cylinder being capable of moving said rotatable support head in front of the opening in said furnace and said elongated feed table being movable relative to said rotatable support head to enable each elongated treatment device supported thereon to extend through the opening in the furnace at a desired angle.

2. The manipulator apparatus according to claim 1, wherein said elongated feed table includes two parallel beams and a lance holder which is attached to said parallel beams and is movable in their length direction.

3. The manipulator apparatus according to claim 1, including a second hydraulic cylinder connected between said swinging bracket and said support stand to vertically rotate said swinging bracket with respect to said support stand, and third and fourth hydraulic cylinders connected between opposite sides of said swinging bracket and said support stand to horizontally rotate said swinging bracket with respect to said support stand.

4. The manipulator apparatus according to claim 3, including a fifth hydraulic cylinder connected between said rotatable support stand and said elongated feed table to move said elongated feed table in its longitudinal direction; a sixth hydraulic cylinder connected between said rotatable support head and said fifth hydraulic cylinder to vertically move said elongated feed table relative to said rotatable support head; and a seventh hydraulic cylinder connected between said rotatable support head and said fifth hydraulic cylinder to horizontally move said elongated feed table relative to said rotatable support head.

5. The manipulator apparatus according to claim 4, including a scraper which is movably mounted on said elongated feed table to clear away deposits from the opening in said furnace.

6. The manipulator apparatus according to claim 5, including an eighth hydraulic cylinder connected between said elongated feed table and said scraper to move said scraper relative to said elongated feed table.

7. An apparatus for treating the contents in the interior of a furnace which has an opening leading to its interior, said apparatus including
    a support stand which is attachable to the furnace so as to be positioned laterally of the opening in the furnace,
    a swinging bracket which is attached to said support stand so as to be horizontally and vertically rotatable with respect thereto, said swinging bracket having a free end which is remote from said support stand,
    a first hydraulic cylinder attached to the free end of said support stand and including a movable piston having a free end which mounts a rotatable support head,
    an elongated feed table attached to said rotatable support head so as to be horizontally and vertically movable with respect thereto and also displaceable in its longitudinal direction, said elongated feed table being capable of supporting at least one elongated treatment device, and
    at least one elongated treatment device mounted on said elongated feed table,
    said swinging bracket and said first hydraulic cylinder being capable of moving said rotatable support head in front of the opening in said furnace and said elongated feed table being movable relative to said rotatable support head to enable each elongated treatment device supported thereon to extend through the opening in the furnace at a desired angle.

8. The apparatus according to claim 7, wherein at least one of said elongated treatment devices consists of a tubular lance.

9. The apparatus according to claim 8, wherein each tubular lance is connected to a feed pipe for supplying a gas thereto.

* * * * *